US010465626B2

(12) United States Patent
Zhang

(10) Patent No.: US 10,465,626 B2
(45) Date of Patent: Nov. 5, 2019

(54) METHOD FOR TESTING A MOISTURE SENSOR OF A DIESEL ENGINE

(71) Applicant: Continental Automotive GmbH, Hannover (DE)

(72) Inventor: Hong Zhang, Tegernheim (DE)

(73) Assignee: Continental Automotive GmbH, Hannover (DE)

( * ) Notice: Subject to any disclaimer, the term of this patent is extended or adjusted under 35 U.S.C. 154(b) by 0 days.

(21) Appl. No.: 16/061,294

(22) PCT Filed: Nov. 15, 2016

(86) PCT No.: PCT/EP2016/077649
§ 371 (c)(1),
(2) Date: Jun. 11, 2018

(87) PCT Pub. No.: WO2017/097543
PCT Pub. Date: Jun. 15, 2017

(65) Prior Publication Data
US 2018/0363583 A1  Dec. 20, 2018

(30) Foreign Application Priority Data

Dec. 11, 2015  (DE) ........................ 10 2015 224 929

(51) Int. Cl.
*F02D 41/22* (2006.01)
*F02D 41/14* (2006.01)
(Continued)

(52) U.S. Cl.
CPC ......... *F02D 41/222* (2013.01); *F02D 41/144* (2013.01); *F02D 41/1454* (2013.01);
(Continued)

(58) Field of Classification Search
CPC .. F02D 41/222; F02D 41/144; F02D 41/1454; F02D 41/1462; F02D 41/1461;
(Continued)

(56) References Cited

U.S. PATENT DOCUMENTS 5,735,245 A  4/1998  Kubesh et al.
9,618,470 B2  4/2017  Uhrich et al.
(Continued)

FOREIGN PATENT DOCUMENTS

DE      103 12 440 A1   10/2004
DE  10 2004 043 933 A1    3/2006
(Continued)

*Primary Examiner* — Rodney A Butler
(74) *Attorney, Agent, or Firm* — Cozen O'Connor

(57) ABSTRACT

A method for testing a moisture sensor of a diesel engine includes: measuring, by an NOx sensor, an untreated NOx emissions content in exhaust gas of the diesel engine upstream of a Selective Catalytic Reduction (SCR) catalytic converter at particular steady-state operating points in a defined window, to obtain an actual concentration value of NOx emissions; determining an oxygen concentration in intake air from an intake pipe of the diesel engine, and converting the result obtained from the determination, by a characteristic curve, into an NOx concentration to obtain a model value of NOx concentration; comparing the actual value with the model value; and identifying a faulty condition of the moisture sensor if a deviation that exceeds a set value (R) is detected between the actual and model values.

7 Claims, 1 Drawing Sheet

(51) Int. Cl.
*G07C 5/00* (2006.01)
*F01N 3/20* (2006.01)

(52) U.S. Cl.
CPC ..... *F02D 41/1461* (2013.01); *F02D 41/1462* (2013.01); *G07C 5/006* (2013.01); *F01N 3/2066* (2013.01); *F02D 41/1456* (2013.01); *F02D 2200/0402* (2013.01); *F02D 2200/0414* (2013.01); *F02D 2200/0418* (2013.01); *F02D 2200/101* (2013.01); *F02D 2200/1002* (2013.01); *F02D 2200/70* (2013.01); *Y02T 10/40* (2013.01)

(58) Field of Classification Search
CPC ......... F02D 2200/1002; F02D 2200/70; F02D 2200/101; F02D 2200/0402; F02D 41/1456; F02D 2200/0418; F02D 2200/0414; G07C 5/006; F01N 3/2066; Y02T 10/40
See application file for complete search history.

(56) References Cited

U.S. PATENT DOCUMENTS

| | | | |
|---|---|---|---|
| 2003/0000232 A1* | 1/2003 | Goth | H05K 7/20381 |
| | | | 62/125 |
| 2003/0106304 A1* | 6/2003 | Miyahara | F02D 41/222 |
| | | | 60/277 |
| 2009/0254245 A1 | 10/2009 | Bauerle | |
| 2011/0094208 A1 | 4/2011 | Bauer et al. | |
| 2013/0118232 A1* | 5/2013 | Auckenthaler | G01N 19/10 |
| | | | 73/29.02 |
| 2014/0238369 A1 | 8/2014 | Jankovic et al. | |

FOREIGN PATENT DOCUMENTS

| | | |
|---|---|---|
| DE | 10 2008 036 418 B4 | 2/2010 |
| DE | 10 2014 105 232 A1 | 10/2014 |
| EP | 2 385 236 A1 | 11/2011 |

\* cited by examiner

METHOD FOR TESTING A MOISTURE SENSOR OF A DIESEL ENGINE

CROSS-REFERENCE TO RELATED APPLICATIONS

This is a U.S. national stage of application No. PCT/EP2016/077649 filed on 15 Nov. 2016, which claims priority to the Germany Application No. 10 2015 224 929.8 filed 11 Dec. 2015, the content of both incorporated herein by reference.

BACKGROUND OF THE INVENTION

1. Field of the Invention

The present invention relates to a method for testing a moisture sensor of a diesel engine.

2. Related Art

The emissions behavior of a diesel engine may be controlled by moisture sensors, by which the moisture in the intake pipe of the diesel engine is measured. A corresponding signal representing the moisture measured can be fed to a control device of the diesel engine, which can control corresponding operating parameters of the diesel engine or of the exhaust system thereof in accordance therewith.

Since a deviation in the relative air humidity of 80% at a temperature of 40° C. already brings about a change in the $O_2$ concentration of 1.3% (absolute), for example, this leads to a change in the $NO_x$ emissions of more than 50%. It is therefore of considerable importance that a moisture sensor of this kind operates correctly.

DE 10 2004 043 933 A1 discloses an exhaust system of an internal combustion engine of a motor vehicle having an exhaust-gas catalytic converter arranged in an exhaust line and a sensor, which is exposed to the exhaust gas of the internal combustion engine and monitors the exhaust system. This sensor is a moisture sensor.

DE 10 2008 036 418 B4 discloses a method for controlling an exhaust-gas aftertreatment system for an internal combustion engine, in the exhaust tract of which an SCR catalytic converter is arranged. In this method, a characteristic variable for a water content of an exhaust gas in the exhaust tract upstream of the SCR catalytic converter of the internal combustion engine is determined, and a catalytic converter temperature is determined in accordance with the characteristic variable for the water content of the exhaust gas in order to obtain an actuation signal for a final control element for the introduction of ammonia into the exhaust gas. In this case, a moisture sensor is arranged in the intake tract of the internal combustion engine, the sensor measuring the air humidity of the intake air there.

SUMMARY OF THE INVENTION

It is an object of the present invention to make available a method by which the operation of a moisture sensor of a diesel engine can be tested in a simple manner.

The object may be achieved according to an aspect of the invention by a method for testing a moisture sensor of a diesel engine, including:

measuring the untreated $NO_x$ emissions content in the exhaust gas of the diesel engine upstream of a Selective Catalytic Reduction (SCR) catalytic converter by an $NO_x$ sensor at particular steady-state operating points in a defined window to obtain an ACTUAL value;

determining the oxygen concentration in the intake air of the diesel engine, and converting the result obtained, by a characteristic curve, into an $NO_x$ concentration to obtain a model value;

comparing the ACTUAL value with the model value; and if a deviation exceeding a set value is detected between the values, a faulty moisture sensor is identified.

The method according to an aspect of the invention is based on the underlying concept of checking the plausibility of the moisture sensor signal by an $NO_x$ sensor signal upstream of an SCR catalytic converter. Here, particular steady-state operating points are selected for the evaluation of the $NO_x$ sensor signal.

On the other hand, the oxygen concentration of the intake air of the diesel engine is determined and converted, by a characteristic curve, into the $NO_x$ concentration. This calculated $NO_x$ concentration, as a model value, is then compared with the $NO_x$ signal from the $NO_x$ sensor (ACTUAL value) upstream of the SCR catalytic converter. If a deviation that exceeds a set value is detected between the values, a faulty moisture sensor is identified. Otherwise, if there is no deviation between the values or only a deviation that does not exceed the set value, a correctly operating moisture sensor is identified.

As a development of the invention, the oxygen concentration in the intake air is determined by measuring the air mass, EGR mass, if available, and moisture in the intake pipe of the diesel engine. Here, "EGR mass" refers to the exhaust gas mass recirculated to reduce the emissions of nitrogen oxides.

"SCR catalytic converter" refers to a Selective Catalytic Reduction (SCR) catalytic converter, which carries out selective catalytic reduction to reduce nitrogen oxides in the exhaust gas. Here, the chemical reaction over the SCR catalytic converter is selective, i.e., there is preferential reduction of nitrogen oxides, while unwanted secondary reactions are largely suppressed.

In particular, the method according to the invention is carried out in such a way that, if a large deviation between the values (the ACTUAL value and the model value) is detected at a high ambient temperature, a faulty moisture sensor is identified. Here, a high ambient temperature corresponds to a value of over 35° C., for example.

During the comparison carried out according to the invention, both the $NO_x$ signal and the moisture signal (for the calculation of the oxygen concentration) should be held approximately constant.

To increase the reliability of diagnosis, in another aspect of the invention the calculated model value is adapted with the measured ACTUAL value at the relevant operating points and at a low ambient temperature, which is less than 20° C., for example.

Operating points of the engine speed and load are preferably selected as particular steady-state operating points.

BRIEF DESCRIPTION OF THE DRAWINGS

The invention is explained in detail below with reference to an exemplary embodiment in connection with the drawings. In the drawings.

DETAILED DESCRIPTION OF THE PRESENTLY PREFERRED EMBODIMENTS

Figure 1:
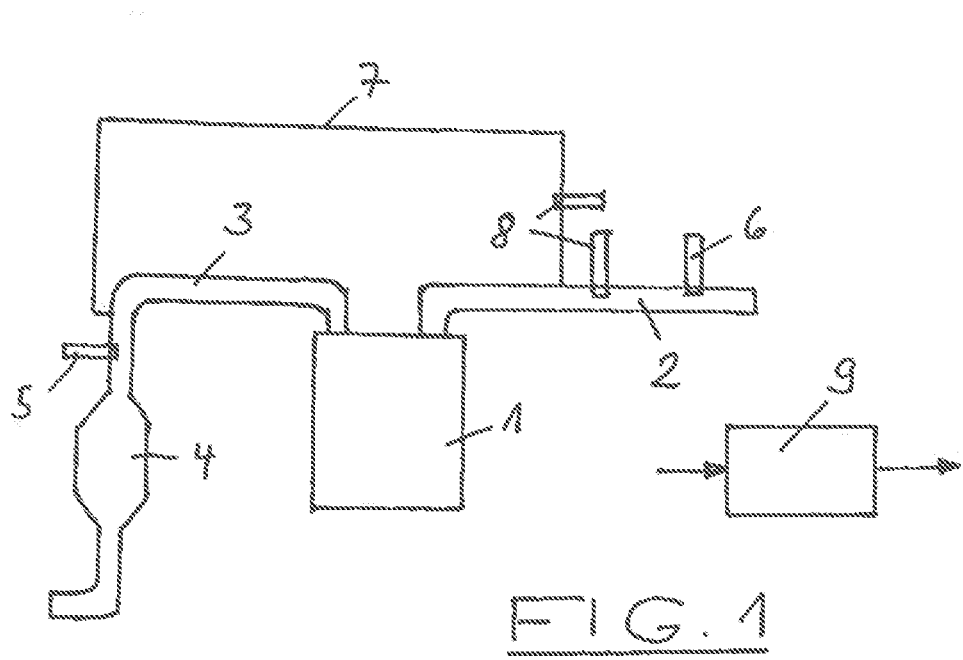
FIG. 1 shows a schematic illustration of a diesel engine having a control unit.

The diesel engine, which is shown only schematically in FIG. 1, has an engine block 1 with an air intake tract that has an air intake pipe 2. Furthermore, the diesel engine has an exhaust tract with an exhaust pipe 3, in which an SCR catalytic converter 4 (SCR=selective catalytic reduction) is arranged. Upstream of the SCR catalytic converter 4 there is an $NO_x$ sensor 5, by which the untreated $NO_x$ emissions content in the exhaust gas is measured.

A schematically illustrated exhaust gas recirculation system (EGR=exhaust gas recirculation) is indicated at 7. Thus, some of the exhaust gas is recirculated into the air intake pipe 2 and is mixed there with the air drawn in.

In the method according to one aspect of the invention, the $NO_x$ content in the exhaust gas of the diesel engine upstream of the SCR catalytic converter 4 is, on the one hand, now measured at particular steady-state operating points (engine speed, load) by the $NO_x$ sensor. The corresponding signal is fed to a controller illustrated schematically at 9.

On the other hand, two sensors 8 are used to measure the air mass in the intake pipe 2 and the EGR mass (mass of recirculated exhaust gas). Moreover, the air humidity in the intake pipe 2 is measured by a moisture sensor 6. The signals of the three sensors are like-wise fed to the controller 9.

From the signals of the sensors 8 and 6, the controller 9 determines an $NO_x$ concentration by a characteristic curve stored in the controller in storage, this concentration being introduced into the method as a model value. This model value is compared by the controller 9 with the $NO_x$ content measured by sensor 5 as the ACTUAL value. If the controller 9 detects a deviation between these values that exceeds a set value, a faulty moisture sensor 6 is identified, and this is indicated by a suitable indicator, for example. Otherwise, the moisture sensor 6 is classified as operating correctly.

More specifically, if a large deviation between the values is detected at a high ambient temperature, e.g. 40° C., a faulty moisture sensor is identified during this process. By the indicator provided, the person controlling the associated vehicle, for example, receives an indication that the moisture sensor needs to be replaced, and can initiate said replacement.

Figure 2:
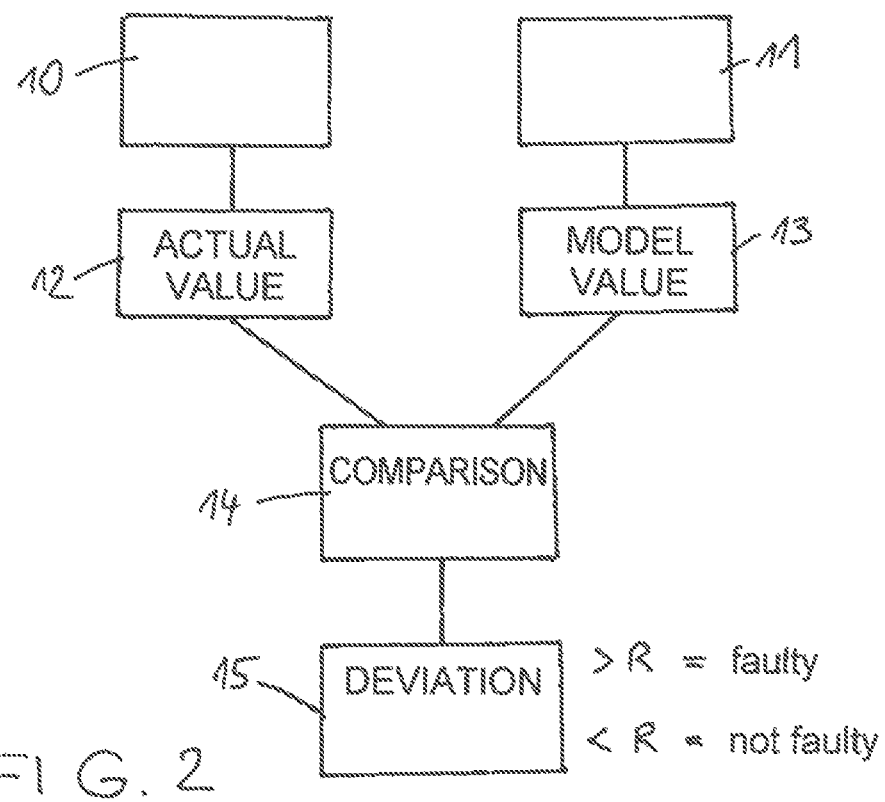
FIG. 2 shows a flowchart of the individual method steps.

FIG. 2 shows the individual steps of the method in a block diagram. In step 10, the $NO_x$ content in the exhaust gas of the diesel engine is measured by the $NO_x$ sensor, more specifically at a steady-state operating point in respect of the engine speed and load. The corresponding signal is fed to a controller and made available there as an ACTUAL value (step 12).

Furthermore, the EGR mass and the air mass in the intake pipe as well as the moisture content in the intake pipe are measured (step 11). The corresponding signals are fed to the controller. From these, the oxygen concentration in the intake pipe is determined in step 13, and, from this, the $NO_x$ concentration is calculated as a model value using a stored characteristic curve (step 13).

At step 14, the two values are compared with one another. At step 15, it is determined whether or not the deviation is greater than a set value (R), wherein a high ambient temperature is taken as a basis. The corresponding moisture sensor is then classified as faulty or not faulty.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for testing a moisture sensor (6) of a diesel engine, the method comprising:
   measuring, by an NOx sensor (5), an untreated NOx emissions content in exhaust gas of the diesel engine upstream of a Selective Catalytic Reduction (SCR) catalytic converter (4) at particular steady-state operating points in a defined window, to obtain an actual concentration value of NOx emissions;
   determining an oxygen concentration in intake air from an intake pipe (2) of the diesel engine, and converting the result obtained from the determination, by a characteristic curve, into an NOx concentration to obtain a model value of NOx concentration;
   comparing the actual value with the model value; and
   identifying a faulty condition of the moisture sensor (6) if a deviation that exceeds a set value (R) is detected between the actual and model values,
   wherein the oxygen concentration in the intake air is determined by measuring the air mass, exhaust gas recirculation (EGR) mass, if available, and moisture in the intake pipe (2) of the diesel engine.

2. The method as claimed in claim 1, wherein the moisture sensor (6) is identified as faulty if the deviation that exceeds a set value (R) is detected at a high ambient temperature.

3. The method as claimed in claim 2, wherein the high ambient temperature corresponds to a value of over 35° C.

4. A method for testing a moisture sensor (6) of a diesel engine, the method comprising:
   measuring, by an NOx sensor (5), an untreated NOx emissions content in exhaust gas of the diesel engine upstream of a Selective Catalytic Reduction (SCR) catalytic converter (4) at particular steady-state operating points in a defined window, to obtain an actual concentration value of NOx emissions;
   determining an oxygen concentration in intake air from an intake pipe (2) of the diesel engine, and converting the result obtained from the determination, by a characteristic curve, into an NOx concentration to obtain a model value of NOx concentration;
   comparing the actual value with the model value; and
   identifying a faulty condition of the moisture sensor (6) if a deviation that exceeds a set value (R) is detected between the actual and model values,
   wherein the model value is adapted with the actual value at the particular steady-state operating points and at a low ambient temperature.

5. The method as claimed in claim 4, wherein the steady-state operating points comprise operating points of engine speed and load.

6. A method for testing a moisture sensor (6) of a diesel engine, the method comprising:
- measuring, by an NOx sensor (5), an untreated NOx emissions content in exhaust gas of the diesel engine upstream of a Selective Catalytic Reduction (SCR) catalytic converter (4) at particular steady-state operating points in a defined window, to obtain an actual concentration value of NOx emissions;
- determining an oxygen concentration in intake air from an intake pipe (2) of the diesel engine, and converting the result obtained from the determination, by a characteristic curve, into an NOx concentration to obtain a model value of NOx concentration;
- comparing the actual value with the model value; and
- identifying a faulty condition of the moisture sensor (6) if a deviation that exceeds a set value (R) is detected between the actual and model values.

7. The method as claimed in claim 6, further comprising, in a case in which a faulty moisture sensor (6) is detected:
- providing an indication that the moisture sensor (6) requires replacement; and
- initiating replacement of the moisture sensor (6).

\* \* \* \* \*